United States Patent [19]

Fowler

[11] Patent Number: 5,546,822
[45] Date of Patent: Aug. 20, 1996

[54] VARIABLE SPEED TORQUE MULTIPLYING TRANSMISSION

[76] Inventor: John E. Fowler, Jack's Trading Post, Sawmill Rd., Whiteriver, Ariz. 85941

[21] Appl. No.: 259,007

[22] Filed: Jun. 13, 1994

[51] Int. Cl.⁶ ............................................... F16H 29/12
[52] U.S. Cl. ............................. 74/113; 74/337; 74/84 R
[58] Field of Search ............................. 74/424.8 R, 337, 74/84 R, 112, 113

[56] References Cited

U.S. PATENT DOCUMENTS

| | | | |
|---|---|---|---|
| 1,046,156 | 12/1912 | Dreisbach | 74/425 |
| 1,754,697 | 4/1930 | Saglioni | 74/425 |
| 1,795,464 | 3/1931 | Banker . | |
| 2,098,716 | 11/1937 | Budlong | 74/337 |
| 2,783,657 | 3/1957 | Kohlhagen | 74/472 |
| 3,049,936 | 8/1962 | Schnell | 74/458 |
| 3,126,753 | 3/1964 | Leach | 74/393 |
| 3,330,165 | 7/1967 | Ishikawa et al. | 74/409 |
| 3,422,702 | 1/1969 | Novinger | 74/793 |
| 3,442,156 | 5/1969 | Novinger | 74/793 |
| 3,641,832 | 2/1972 | Shigeta et al. | 74/427 |
| 3,727,474 | 4/1973 | Fullerton | 74/200 |
| 4,023,430 | 5/1977 | Imamura | 74/412 |
| 4,487,085 | 12/1984 | Collins | 74/113 |
| 4,615,230 | 10/1986 | Guichard | 74/427 |
| 5,222,405 | 6/1993 | Reynolds | 74/351 |

FOREIGN PATENT DOCUMENTS

922095   11/1954   Germany .

Primary Examiner—Rodney H. Bonck
Assistant Examiner—David Fenstermacher
Attorney, Agent, or Firm—Cahill, Sutton & Thomas P.L.C.

[57] ABSTRACT

An automatic transmission incorporating a means for varying the ratio of input rotational velocity to output rotational velocity. A cylinder cam is mounted on a cam driver having a helical gear tooth thereon engaging corresponding helical internal gear teeth within the cylinder cam. The cylinder cam incorporates a continuously varying cam angle and is axially translatable along the cam driver; the cam is positioned on the cam driver automatically in accordance with torque requirements by the forces transmitted to the cam through the helical gears of the cam driver. Spherical cam followers mounted in a sphere cluster engage the cylinder cam; the clusters are mounted for rotation about an axis perpendicular to the axis of rotation of the cam.

24 Claims, 5 Drawing Sheets fig. 1 fig. 2 fig. 3 fig. 4 fig. 5 fig. 6 fig. 7

5,546,822

VARIABLE SPEED TORQUE MULTIPLYING TRANSMISSION

FIELD OF THE INVENTION

The present invention pertains to transmissions, and more particularly to transmissions that provide variable output shaft speed for a given input shaft speed with a corresponding torque multiplication.

BACKGROUND OF THE INVENTION

The utilization of variable transmissions for adjusting shaft speed and/or torque multiplication has been the subject of numerous investigations and correspondingly numerous transmission designs. Such torque multiplying speed varying transmissions have general applicability as industrial drives for use in such applications as pump drives, conveyor drives and the like. Of course, vehicular applications are the most well known and perhaps the most challenging.

Prior art variable speed transmissions take a great variety of forms. Most such transmissions are not truly mechanical variable speed transmissions but rather depend on the intervention of other media. For example, the conventional present day automatic transmission is in fact a hydraulic torque convertor that incorporates a mechanical shifting mechanism for selecting gear ratios; thus, a variety of non-mechanical signals are necessary to dictate to such transmission when a mechanical ratio change is effected. Obviously, conventional manual transmissions can be considered variable in that with the operation of a clutch to disengage the transmission from a power source and appropriate levers and linkages, one of several gear ratios may be selected.

Transmissions that are truly variable, that is, transmissions that provide an infinite gradation of ratios between input and output shafts over at least a given range of rotational speed, are usually not purely mechanical. Those transmissions that are mechanical and provide this infinite ratio of input/output shaft speed tend to be very inefficient. For example, various friction drives sometimes depend on varying effective diameters of intersecting wheels or cones to effectuate an infinite varying ratio of input to output shaft speed. Refinements in these types of mechanical infinitely variable transmissions frequently limit their torque and horsepower capacities.

Variable transmissions incorporating a fundamental design directed to a particular type of power source may be inapplicable when directed to another. For example, variable transmissions designed for application with internal combustion engines are usually totally inappropriate when the power source is other than an IC engine. For example, electric motors that may be utilized for propelling vehicles generally have excellent torque characteristics and do not require the torque multiplication over the speed range of a typical IC engine. However, to maintain the overall vehicle efficiency it is frequently desirable to provide a variable transmission to maintain peak efficiency operational parameters for the electrical power source and electric motor while giving flexibility to vehicle performance.

OBJECTS THE INVENTION

It is therefore an object of the present invention to provide a variable transmission to provide infinitely variable ratios between an input and output shaft.

It is also an object of the present invention to provide a variable transmission whose variable ratios may be automatically selected by purely mechanical means within the transmission.

It is also an object of the present invention to provide a variable transmission that automatically provides appropriate torque multiplication.

It is still another object of the present invention to provide an automatic transmission whose speed variation and torque multiplication is derived mechanically.

It is still another object of the present invention to provide a mechanically variable transmission incorporating a means for seeking a required torque output and varying speed ratios between input and output shafts to correspond with the torque requirements.

These and other objects of the present invention will become apparent to those skilled in the art as the description thereof proceeds.

SUMMARY OF THE INVENTION

The present invention interconnects an input drive shaft with an output shaft through a plurality of drive couples, each of which incorporates a cylinder cam and an associated cam driver. The input shaft is geared to drive the cam driver which in turn drives the cylinder cam. The cylinder cam incorporates a continuously varying cam tooth pitch and pitch angle which successively engages cam followers in the form of spheres. The spheres are arranged in a cluster in a circular array about a cluster hub. The cluster hub drives the transmission output shaft through a bevel gear arrangement. As power is applied to the input drive shaft and is applied to the cam drivers associated with each drive couple, the inclination of a helical tooth on the cam driver attempts to adjust the positioning of the cylinder cam as it engages a corresponding sphere of the spherical cluster to produce the lowest drive ratio (input rotation divided by output rotation) as possible. Resistance to rotation imposed on the output shaft causes the repositioning of the cylinder cams to increase the torque and the drive ratio until sufficient torque is delivered to the output shaft to cause its rotation. As the torque requirements lessen, the cylinder cams reposition themselves continuously to reduce the drive ratio and increase the speed of the output shaft.

BRIEF DESCRIPTION OF THE DRAWINGS

The present invention may more readily be described by reference to the accompanying drawings in which.

DESCRIPTION OF THE PREFERRED EMBODIMENTS

Figure 1:
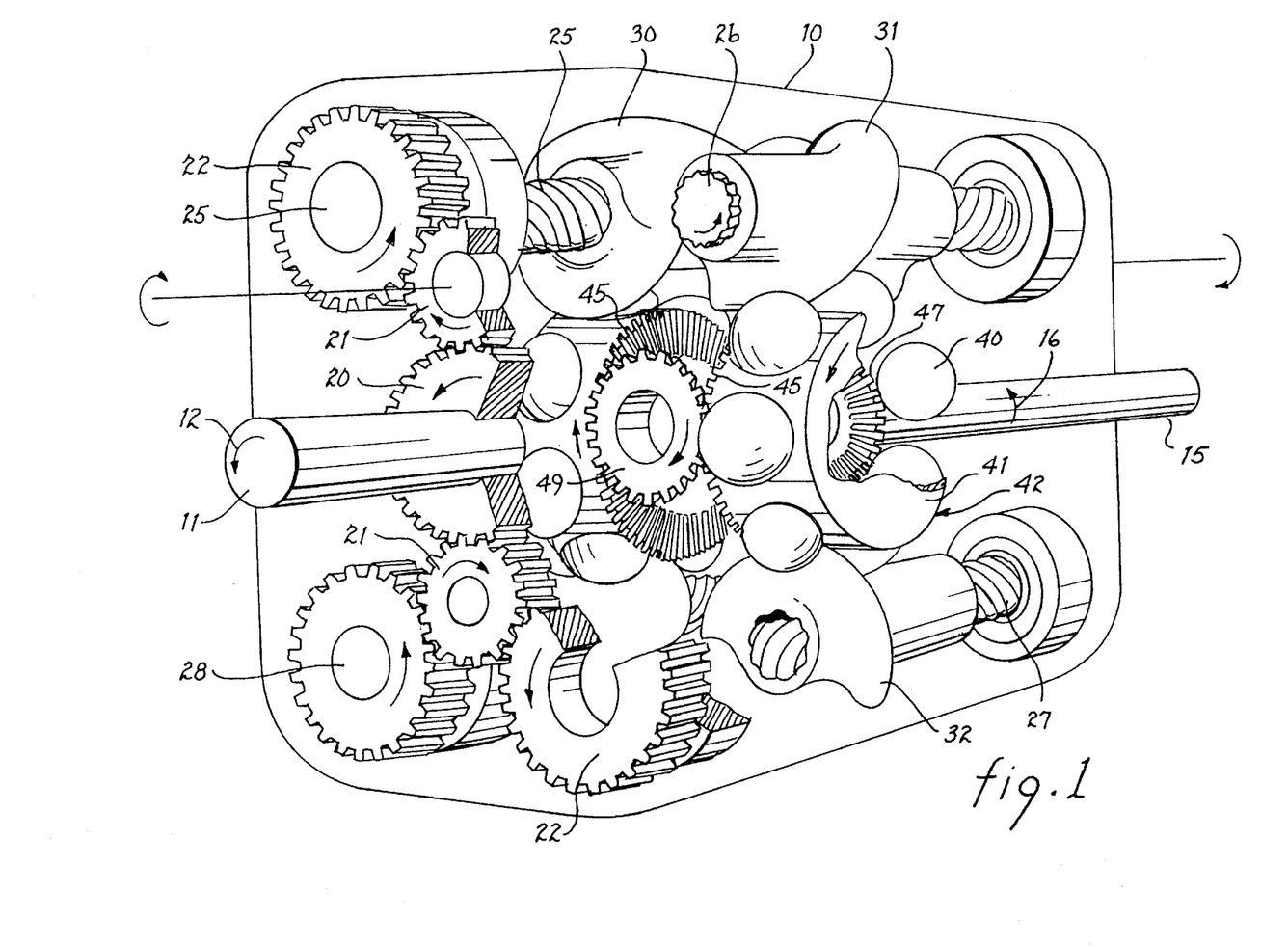
FIG. 1 is a perspective view, partly in section, and partly exploded of a transmission constructed in accordance with the teachings of the present invention.

Referring now to FIG. 1, a perspective view, partly in section and partly exploded, of a transmission constructed in accordance with the teachings of the present invention is shown. This figure is useful in the description of the invention; however, the individual components will be described in greater detail hereinafter. The casing and internal supporting structure of the transmission has been eliminated to expose the working components of the transmission. It will be apparent to those skilled in the art that various casing configurations can be constructed incorporating usual webbing to support bearings which in turn support shafts and other rotating parts. The transmission 10 is shown in a format suitable for applications such as automotive usage. An input shaft 11 is connected to a suitable source of power, such as an internal combustion engine and is driven in the direction indicated by the arrow 12. Torque supplied to the input shaft 11 is delivered to a coaxially positioned output shaft 15 driven to rotate in the direction indicated by the arrow 16. The ratio of input shaft velocity to output shaft velocity as well as required torque multiplication between the input and output shafts is determined by the mechanical elements interconnecting the two shafts.

The input drive shaft 11 is keyed to and drives the input drive gear 20 which in turn meshes with a plurality of idler gears 21. In the embodiment chosen for illustration, there are four idler gears (to facilitate the description, only two are shown in FIG. 1), each meshing with and in driving relationship with a corresponding cam drive gear 22. Each cam drive gear is keyed to and drives a respective cam driver 25, 26, 27 and 28 formed, in the embodiment chosen for illustration in FIG. 1, by helical gears each having a predetermined pitch, helix angle and number of teeth. The cam drivers contact internal helical threads of cylinder cams 30, 31, 32 and 33, respectively; each of the cylinder cams 30–33 are thus mounted on a cam driver with the internal threads of the cams meshing with the helical threads of the corresponding cam driver. The cylinder cams 30–33 are therefore each mounted on a corresponding cam driver 25–28 and would normally be free to translate along the axis of the corresponding cam driver when the latter is rotated. However, such translation is restricted in a manner to be described. The cylinder cams are open ended; that is, they are formed with a camming tooth having continuously varying tooth pitch and tooth angle beginning at one end of the cam and terminating at the opposite end of the cam.

Each of the cylinder drive cams 30–33 is formed having a continuously varying cam tooth pitch and cam tooth angle. The cylinder drive cams engage spherical cam followers or spheres 40 positioned about sphere races 41 to form sphere clusters 42. Each sphere cluster 42 is mounted for rotation about an axis substantially perpendicular to the axis of rotation of the corresponding cylinder drive cam. In the embodiment chosen for illustration in FIG. 1, each sphere cluster 42 contains seven spherical cam followers or spheres 40 uniformly spaced about the cluster. As they rotate, the cylinder cams successively contact individual spherical cam followers and thereby cause the rotation of the sphere cluster in a manner to be described more fully hereinafter. The rotation of the sphere clusters causes the rotation of the integrally formed sphere cluster bevel gears 45. In the embodiment chosen for illustration, and for simplicity of description, the sphere cluster bevel gears 45 are formed integrally with the sphere races 41; it will be obvious to those skilled in the art that it may be more economical to manufacture and to assemble the sphere race and corresponding bevel gears as independent components keyed to rotate with each other. It may be noted that the sphere races 41 rotate in opposite directions so that the opposed facing sphere cluster bevel gears 45 may engage an output drive bevel gear 47 that is keyed to and drives the output shaft 15. An idler bevel gear 49 is positioned diametrically from the output drive bevel gear 47 to balance the forces applied to the sphere race bevel gears.

In the embodiment chosen for illustration in FIG. 1, four drive couples are utilized, each drive couple comprising a cylinder cam 30–33 and a cam driver 25–28. The respective cylinder cams contact the spheres of one of a pair of sphere clusters. The sphere clusters are formed of steel spheres, such as ball bearings, that are captured within a bearing race or sphere race using well known bearing techniques. As mentioned above in connection with FIG. 1, the sphere race is shown having an integrally formed bevel gear; however, it may be feasible to form the sphere race apart from the bevel gear and connect the bevel gear to the race using a splined or keyed shaft. As an alternative to the spheres and sphere race, it may also be possible to form a gear having gear teeth with appropriate contoured contact surfaces to mate with a corresponding surface on the cylinder cam; however, it is believed that the more economical approach is that described using spherical steel balls captured within a sphere race to form a cluster.

In the embodiment of FIG. 1, the four drive couples each power the output shaft at respective 90° intervals such that a rotation of any single cam 360° results in the passage of a minimum of one and a maximum of four spheres of the corresponding sphere cluster. The ratio of input rotational velocity to output velocity may therefore vary from 4:1 to 1:1. It may be noted that the sphere clusters incorporate seven spheres; it is believed that this number is most appropriate for practical applications although other numbers may be used. It is important to note that an odd number of spheres insures that the cams do not always drive the sphere cluster during each rotation primarily through the same sphere, thus assuring more even wear of the sphere and cluster.

Figure 2:
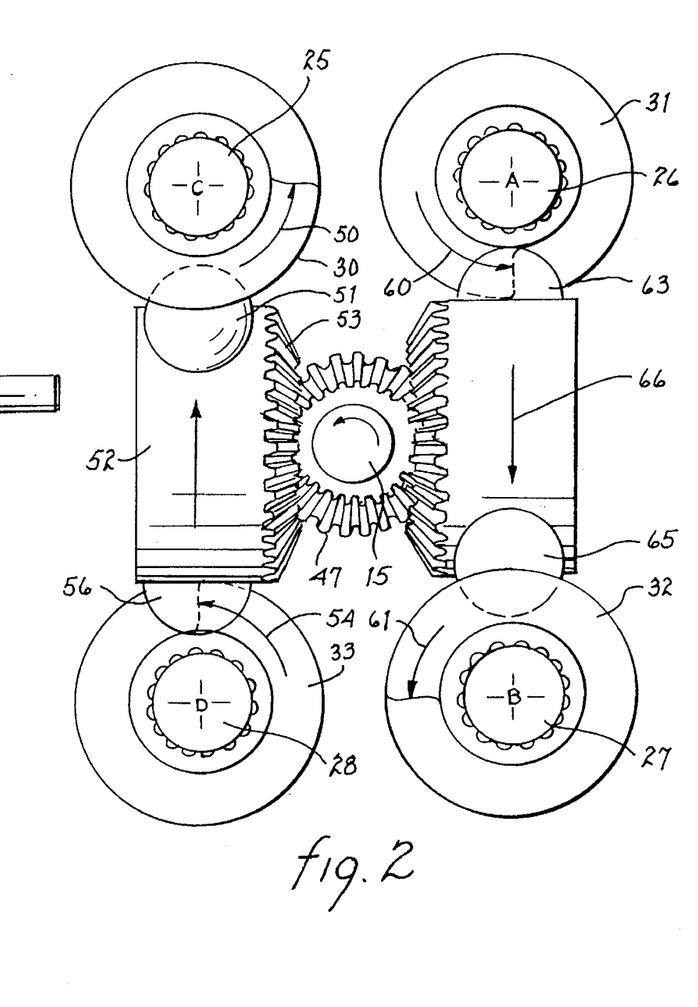
FIG. 2 is a schematic end view of a portion of the transmission of the present invention useful for describing the relative motion of the drive couples with the corresponding sphere clusters.

Referring now to FIG. 2, a schematic end view of a portion of the transmission of the present invention is shown. This figure is useful for describing the relative motion of the drive couples with the corresponding sphere clusters. Cam driver 25, (driven by the input shaft through the cam drive gear as described in connection with FIG. 1) extends through and meshes with the internal helical threads of the corresponding cylinder cam 30. The cylinder cam is thus rotated in the direction indicated by the arrow 50 and contacts sphere 51 of the sphere cluster mounted on cluster hub 52. As described previously, the race of the cluster hub 52 is formed integrally with the bevel gear 45. The drive cams operate in pairs and the corresponding second cylinder cam of the pair is cam 33. The latter cam is connected to cam driver 28 which is driven from the input shaft in the direction indicated by the arrow 54. Cam driver 28 meshes with the internal helical threads of cylinder cam 33 which contacts sphere 56 of the sphere cluster. The driven rotation of cam drivers 25 and 28, and the corresponding driven rotation of the cylinder cams 30 and 33 results in the constant contact of the cams with the spheres of the sphere cluster.

In a similar manner, cam driver pair 26 and 27 are each driven from the input drive shaft in the directions indicated by the arrows 60 and 61 and are coupled to their corresponding cylinder cams 31 and 32, respectively, by the internal helical threads provided in each of the cylinder cams. The cams 30 and 32 contact spheres 63 and 65, respectively, of the sphere cluster and thus induce or force the rotation of the cluster in the direction indicated by the arrow 66. Since all of the cam drivers are driven from a common input shaft, they rotate in the directions indicated by their respective arrows resulting in the transmission of force from the rotation of the input shaft to the rotation of the output drive bevel gear 47. This output bevel gear 47 is keyed to the output shaft 15.

Figure 3:
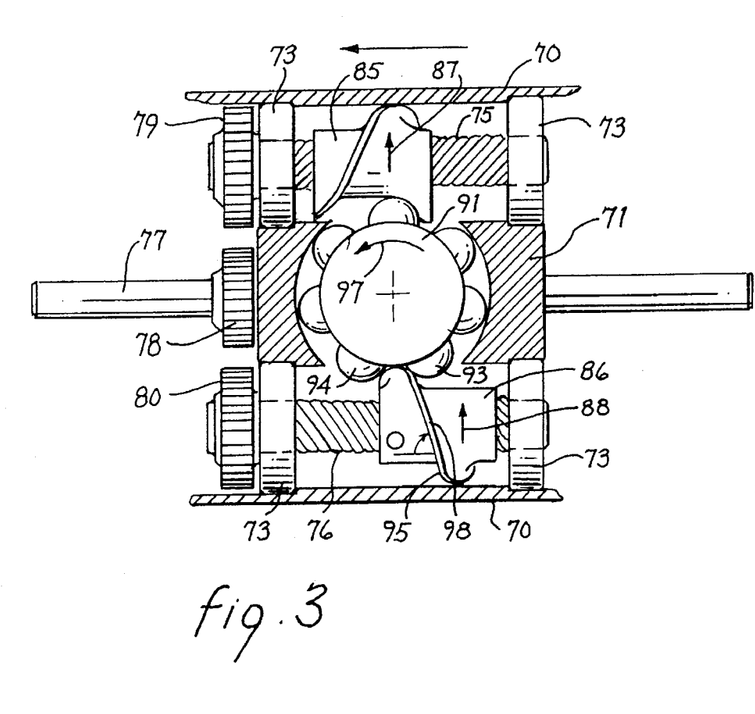
FIG. 3 is a side elevational view of selected transmission components of a simplified embodiment useful for describing the operation of the transmission of the present invention.

The cooperation of pairs of cam drivers and corresponding cylinder cams may be explained by reference to FIG. 3. FIG. 3 is a side elevational view of selected transmission components of a simplified embodiment useful for describing the operation of the transmission. It may be seen by reference to FIG. 3 that the transmission case 70 and internal webbing 71 support bearings 73 35 which in turn support cam drivers 75 and 76. The cam drivers are in turn driven by the input shaft 77 through input drive gear 78 and cam drive gears 79 and 80. For simplicity, idler gears that would transmit power from the input drive gear to the cam drive gears have been removed from FIG. 3. The rotation of the cam drivers 75 and 76 is transmitted through their helical threads meshing with and engaging the internal helical threads of the cylinder cams 85 and 86, respectively, to cause the latter to rotate in the direction indicated by the arrows 87 and 88. The cylinder cams 85–86 in turn successively contact spheres of sphere cluster 91. In the position shown in FIG. 3, the cylinder cam 86 is in contact with the sphere 93 and forcing the sphere to the right. The cam tooth 95 of the cam 86 is positioned in between spheres 93 and 94; it is important to note that with regard to the pair of drive couples 75, 85 and 76, 86 a cam tooth is always positioned between the spheres of a cluster. That is, at all times during the operation of the transmission, and with regard to any one operating pair of drive couples, the corresponding sphere cluster is always in contact with the cam tooth of a cylinder cam and is always positioned with a cam tooth between two adjacent spheres of the sphere cluster. As the cylinder cam 86 continues to rotate, the sphere 93 "rides" along the surface of the cam tooth and is accelerated in the direction indicated by the arrow 97 until it has passed out of contact with the cam tooth. By the time such contact is discontinued, the cam teeth of cylinder cams will have begun contact with another sphere of the sphere cluster and the process for driving the sphere cluster will repeat. It is important to note that the thickness 98 of the face of the cam tooth 95 varies and is tapered as the cam tooth extends from the forward to the rearward portion of the cam. The variable cam tooth thickness compensates for the continuously varying cam tooth angle θ (FIG. 4) of the cam tooth; that is, the angle θ between a tangent to the outer edge of the cam tooth and the axis of rotation of the cylinder cam. The varying cam tooth angle imparts acceleration to the spheres contacting the drive surfaces thereof; further, the varying thickness of the outer face of the cam teeth permits the cam teeth to be positioned between adjacent spheres and occupy the inter-sphere distance even though the angle of entry into that inter-sphere distance decreases relative to the cam tooth as the angle of the cam tooth decreases.

Using two drive couples as shown in FIG. 3 results in the driving or rotation of the sphere cluster such that each complete 360° rotation of a cylinder cam passes a minimum of one and a maximum of two spheres of the sphere cluster. Therefore, one of the cylinder cams is always contacting and driving a corresponding sphere while the other cylinder cam is rotating into position and contacting a different sphere of the sphere cluster. As the cylinder cams continue to rotate, the cylinder cams continue to contact succeeding spheres and transmit the force to the spheres to cause rotation of the sphere cluster. The description of the axial positioning of the cylinder cams on their respective cam drivers will be discussed more fully hereinafter. It may be noted with reference to FIG. 3 that the cylinder cams 85 and 86 are each mounted on respective cam drivers 75 and 76 that incorporate helical gear teeth that mesh with corresponding internal helical gear teeth within each of the cylinder cams. Thus, if the sphere clusters and spheres were not present to restrain cam movement, the cylinder cams would be free to rotate about the cam drivers and advance axially along the cam drivers.

However, since the cams are not free to rotate about the cam drivers because they contact corresponding spheres, and since the cams must drive the spheres and transmit force thereto, an interaction of forces occurs between the cam drivers and the cams through the helical gear teeth of the respective cam drivers and cylinder cams.

The pair of drive couples described in connection with FIG. 3 represent an embodiment utilizing two drive couples positioned at 180° about the sphere cluster. One rotation of one of the drive cams results in the passage of a minimum of one and a maximum of two spheres on the sphere cluster. The embodiment of FIG. 1 uses four drive couples which results in the passage of a maximum of four spheres for each rotation of a drive cam. The rate of change of the continuously varying tooth angle is chosen to accommodate the number of drive couples used in the transmission. The number of drive couples may be increased; for example, if six drive couples were utilized, one rotation of a cylinder cam would result in the passage of a maximum of six spheres past the cam. It may be noted that a minimum of two drive couples are required for continuous operation since a single drive couple will lose synchronization between the drive couple and the driven sphere cluster. The interaction of the cylinder cams and their corresponding cam drivers may best be described by reference to FIGS. 4, 5 and 6.

Figure 4:
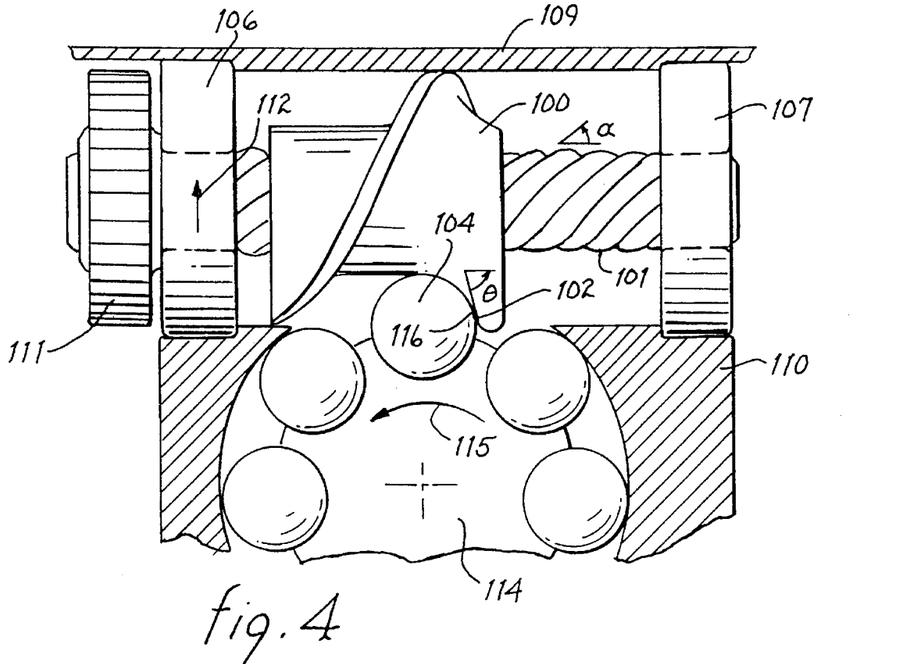
FIG. 4 is a side elevational view of a couple and associated sphere cluster arranged in a high ratio position.

Referring to FIG. 4, a drive couple is shown comprising a cylinder cam 100 and an associated cam driver 101. The cylinder cam has a continuously varying cam tooth pitch; that is, the angle θ that the cam tooth edge 102 makes with the axis of rotation of the cam shown in FIG. 4 as the angle theta. The 35 drive couple is shown with the cam in contact with a sphere 104. The cam driver 101 is rotatably supported by a pair of bearings 106 and 107 which in turn are supported by the transmission frame 109 and webbing 110. The cam driver 101 is driven through the cam drive gear 111. Rotation of the cam in the direction indicated by the arrow 112 causes the sphere 104 to move to the left in FIG. 4 and thus cause the rotation of the sphere cluster 114 in the direction indicated by the arrow 115. The initial contact of the cylinder cam 100 with the sphere 104 is at a point 116 where the cylinder cam tooth angle theta is at a maximum. When the cam is in the position shown, the number of revolutions of the cam to rotate the sphere cluster 360° would be at a maximum; that is, the position of the cylinder cam 100 and the sphere 104 as shown in FIG. 4 represents a high gear ratio. In this position, the sphere advances the least number of degrees about the sphere cluster per degree of rotation of the cylinder cam about its axis. Also, in this particular position, maximum forces can be applied to the sphere which translates into maximum torque applied to the sphere cluster and the sphere race. However, the cam is being driven by the cam driver through helical gear teeth, which in the embodiment chosen for illustration and shown in FIG. 4 have a helix angle α of 45°. The cam may therefore translate along the axis of the cam driver depending on the forces required to move the sphere in contact therewith and rotate the sphere cluster. The force transmitted from the cam driver to the cam is through the 45° helix angle; this angle may be selected to favor high or low gear ratio of the drive couple/sphere cluster combination depending on the application of the transmission.

Figure 5:
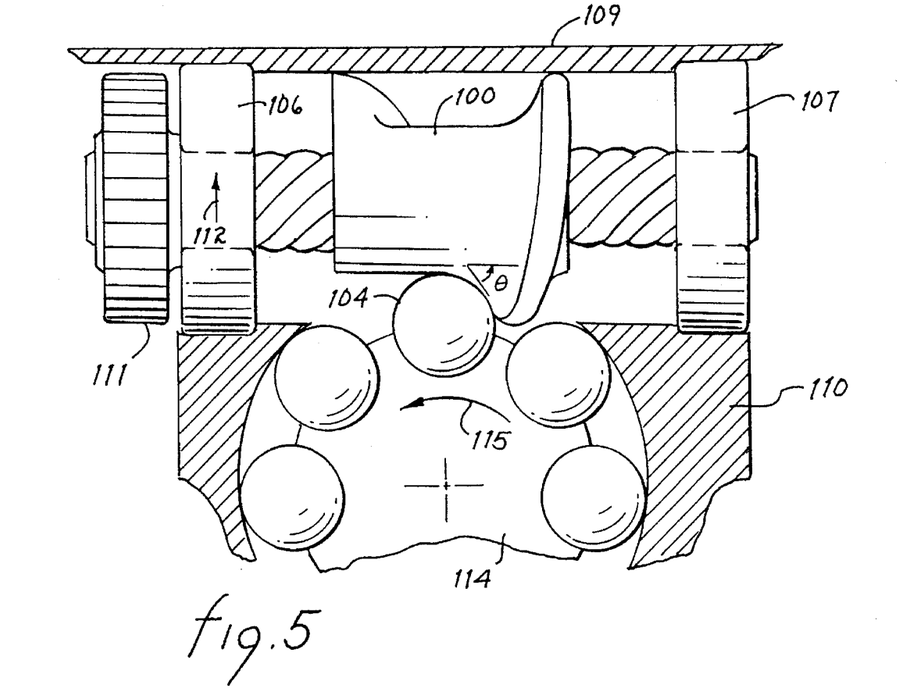
FIG. 5 is a side elevational view of a couple and associated sphere cluster arranged in a mid ratio position.

Referring to FIG. 5, the cam driver and cylinder cam of FIG. 4 is shown positioned to provide a mid-gear ratio. It may be noted that the portion of the cam tooth in contact with the sphere is at a cam tooth angle theta less than that of the cam tooth angle theta contacting the sphere in FIG. 4. It may be seen by comparison of FIGS. 4 and 5 that the cylinder cam has positioned itself or translated to the right as it rotates and while it is being driven by the cam driver helical gear and is driving the sphere cluster.

Figure 6:
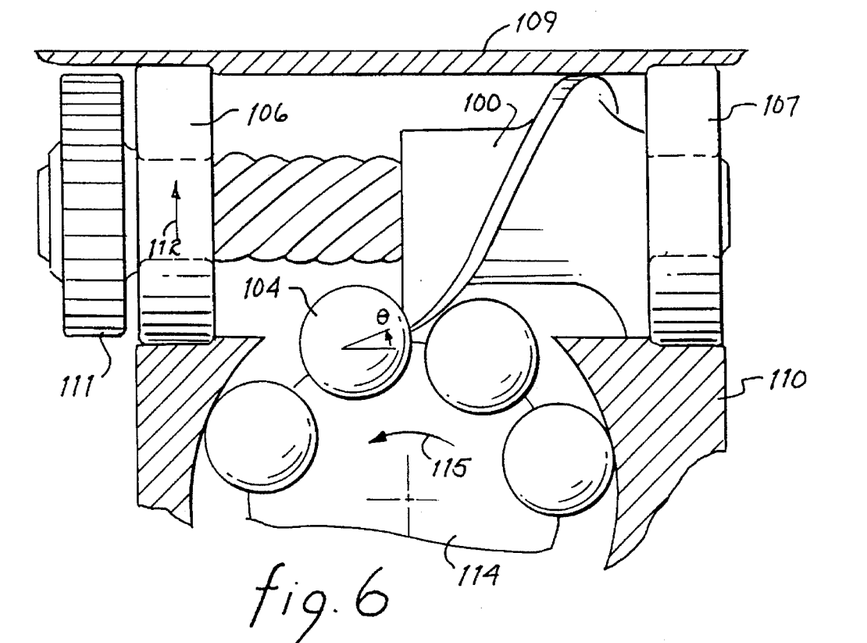
FIG. 6 is a side elevational view of a couple and associated sphere cluster arranged in a low ratio position.

FIG. 6 shows the cylinder cam positioned to the right on the cam driver with the smallest cam tooth angle theta contacting the sphere. Thus, it may be seen by reference to FIGS. 4, 5 and 6 that the cylinder cam drives a contacting sphere through its continuously varying cam tooth angle while the cam is being driven by the cam driver comprising a helical gear having a helix angle of 45°. The cylinder cam is permitted to translate along the axis of the cam driver while the cam is rotating and driving the sphere cluster. As the cam positions itself along the axis of the cam driver, the gear ratio varies from a high ratio when the cam is positioned to the left as shown in FIG. 4 to a low ratio when the cam is positioned to the right as shown in FIG. 6. The helix angle and the continuously varying cylinder cam angle can be proportioned so that when minimum torque requirements are required of the transmission (such as when the load on the output shaft is disconnected and the sphere cluster is free to rotate) the cam is biased to the right or low ratio position thus permitting the highest rotational speed to the output shaft (but lowest torque). As load is placed on the output shaft and the sphere cluster is restrained from rotation, the forces imposed on the cam forces the cam to translate to the left; the forces transmitted to the cam through the helical teeth of the cylinder cam driver continue to force the cam to rotate but permit the cam to work toward the left to ultimately position itself in a high ratio position. Under the latter conditions, output shaft speed will be at a minimum but torque will be at a maximum.

Figure 7:
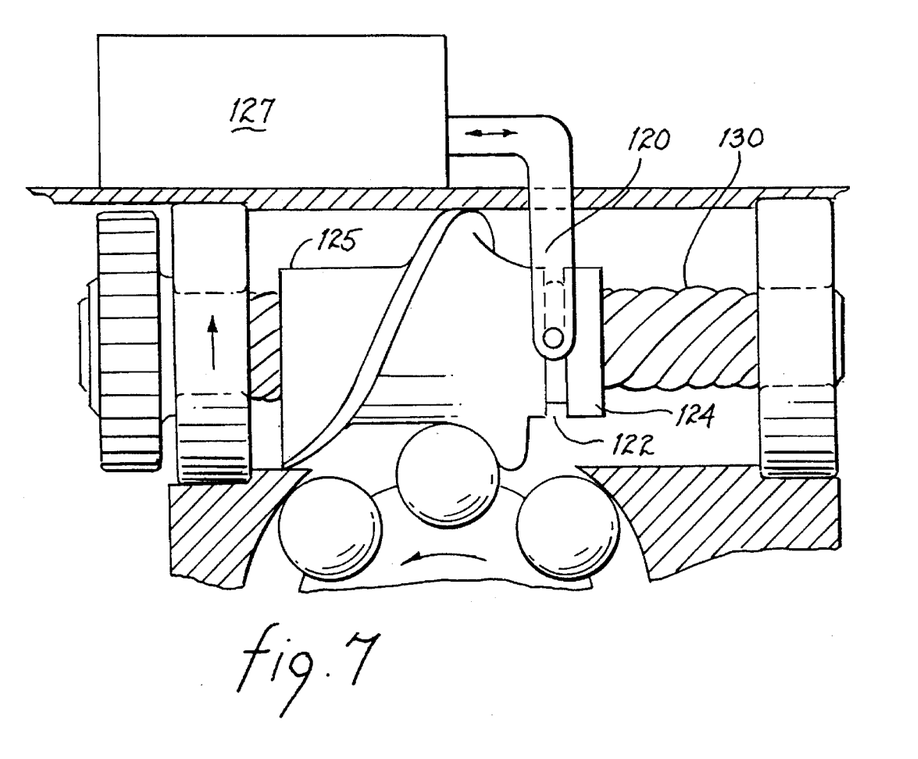
FIG. 7 is a side elevational view of a portion of the transmission of the present invention showing a modification incorporating a ratio selection means.

The ratio may be selected by means other than the use of the helical teeth of the cam driver; for example, referring to FIG. 7, a shift fork 120 is shown engaging a circumferential groove 122 provided on an extension 124 to the cylinder cam 125. The shift fork 120 may be positioned through the utilization of a selector mechanism 127 that may move the shift fork, and the cam 125, along the cam driver 130. It will be recognized by those skilled in the art that the selector mechanism may be hydraulically operated, electrically operated, or under some circumstances may be manually operated. When the transmission is to be utilized for high torque environments it is probable that hydraulic actuation of the selector will be necessary; however, in low torque applications such as conveyor belts and the like an operator is likely to have sufficient strength to position the selector.

The above embodiments have been described in terms of a drive couple incorporating a cylinder cam and a cam driver wherein the driver included helical gear teeth having a predetermined pitch and helix angle. The interaction of the cylinder cam and cam driver of a drive couple facilitated the automatic positioning of the cam along the driver to accommodate load and torque demands and to automatically select the appropriate gear ratio. Cam tooth angles ranging from approximately 85° at the high ratio portion of the cam to a cam tooth angle of approximately 60° at the low ratio end of the cam are believed appropriate when the helix angle for the cam driver is preferably approximately 45°. When external selection mechanisms are incorporated to select an appropriate gear ratio such as those systems described in connection with FIG. 7, it is possible to replace the helical gear teeth of the cam driver with alternative means for connecting the cam with the cam driver. For example, the cam and driver may be coupled together by a key riding axially slidably within a slot; however, a more practical technique would be to utilize a splined shaft such as that shown in FIG. 8.

Figure 8:
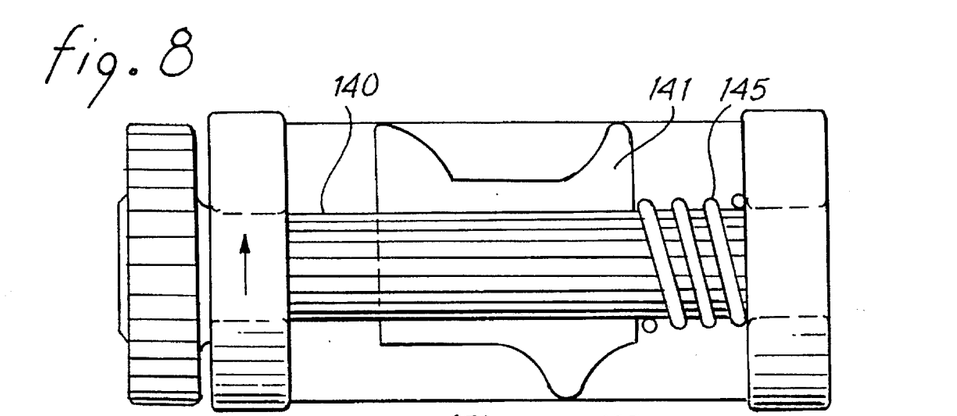
FIG. 8 is an alternative embodiment of the drive couple of the transmission of the present invention.

Referring now to FIG. 8, the cam driver 140 is formed into a splined shaft slidably engaging mating internal splines provided in the cylinder cam 141. Rotational force of the cam driver 140 is thus imparted to the cam 141 while the cam is free to translate axially along the cam driver. The utilization of a drive couple such as that shown in FIG. 8 would result in the cylinder cam automatically translating along the cam driver to a position providing a low ratio; to position the cylinder cam to provide other ratios would require an external force applied axially to the cam from a source such as the ratio selector described in connection with FIG. 7. The cylinder cam of FIG. 8 may be biased through the use of a spring 145 to position the cam axially along the cam driver to a preferred position. The springs may be designed having spring constants corresponding to the load requirements of the transmission for a particular application.

Figure 9:
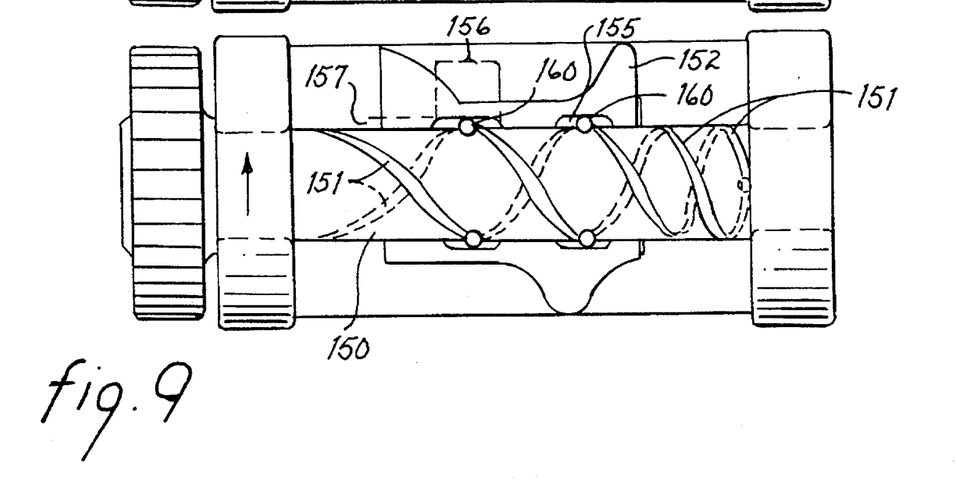
FIG. 9 is another alternative drive couple that may be incorporated in the transmission of the present invention.

Another embodiment of the drive couple of the transmission of the present invention is shown in FIG. 9. In FIG. 9, the cam driver 150 incorporates grooves 151 formed in the surface thereof that wrap about the cylindrical surface of the driver and incorporate a continuously varying helix angle. It may be seen that as the grooves extend from left to right in FIG. 9 the angle that a tangent to the groove makes with respect to the axis of the driver increases. The cylinder cam 152 is provided with a plurality of internal slots 155 each having a predetermined axial length 156 and radial depth 157. The slots act to capture a plurality of steel balls 160 between the interior of the cam and the slots in the cam driver. As the driver rotates, forces are transmitted from the channels in the surface of the driver through the corresponding steel balls to the walls of the slots provided in the interior of the cylinder cam. The force thus transmitted from the cam driver to the cam through the respective steel balls results in the rotational driving of the cam while permitting the cam to translate along the axis of the driver to a position corresponding the load demands being placed on the drive couple. The axial length 156 of the respective internal slots 155 permit the steel balls 160 to position themselves axially to accommodate the pitch changes in the grooves 151 resulting from the continuously varying helix angle. Thus, the steel balls 160 will assume positions closer to one another as the cam 152 approaches the right of cam driver 150.

The transmission of the present invention therefore permits a power source such as an IC engine or electric motor to drive an input shaft and deliver the power, in terms of torque and rotational velocity, to an output shaft in accordance with the demands made upon the output shaft. That is, in an automotive environment for example, high torque requirements such as hill climbing or starting from a stop will cause the individual drive couples of the transmission to position themselves to a high ratio thus providing high torque to the output shaft. Conversely, when the load decreases to a steady state such as when the vehicle is on the level at a constant speed, the transmission adjusts itself to the lowest ratio possible.

What is claimed is:

1. A means for varying the ratio of an input rotational velocity to an output rotational velocity comprising:

a cam driver mounted for rotation about a driver axis;

an open ended cylinder cam having a camming tooth with a continuously varying tooth pitch and tooth angle mounted on said driver to be driven thereby;

said cam translatable axially of said driver;

means for axially positioning said cam on said driver; and a plurality of cam followers each successively contacting said cam to be driven thereby arranged to form a cam follower cluster mounted for rotation about an axis perpendicular to said driver axis.

2. The combination set forth in claim 1 wherein said means for axially positioning said cam on said driver comprises helical gear teeth on said driver engaging internal helical teeth in said cam.

3. The combination set forth in claim 1 wherein said means for axially positioning said cam on said driver comprises variable pitch helical grooves formed in said driver and including means secured to said cam for engaging said grooves.

4. The combination set forth in claim 1 wherein said means for axially positioning said cam on said driver comprises a splined driver engaging mating internal splines within said cam and including a selector mechanism engaging said cam for positioning said cam on said driver.

5. A means for varying the ratio of an input rotational velocity to an output rotational velocity comprising:

a cam driver mounted for rotation about a driver axis;

a cylinder cam having a camming tooth having a continuously varying tooth pitch and tooth angle, said tooth beginning at an axial end of said cam and terminating at an opposite axial end of said cam, said tooth having a continuously varying thickness at its outer face;

said cam translatable axially of said driver;

means for axially positioning said cam on said driver; and a plurality of cam followers each successively contacting said cam to be driven thereby arranged to form a cam follower cluster mounted for rotation about an axis perpendicular to said driver axis.

6. The combination set forth in claim 5 wherein said means for axially positioning said cam on said driver comprises helical gear teeth on said driver engaging internal helical teeth in said cam.

7. The combination set forth in claim 5 wherein said means for axially positioning said cam on said driver comprises variable pitch helical grooves formed in said driver and including means secured to said cam for engaging said grooves.

8. The combination set forth in claim 5 wherein said means for axially positioning said cam on said driver comprises a splined driver engaging mating internal splines within said cam and including a selector mechanism engaging said cam for positioning said cam on said driver.

9. In a variable speed transmission, the improvement comprising:

a cam driver for connection to a source of power, said driver mounted for rotation about a driver axis;

an open ended cylinder cam having a camming tooth with a continuously varying tooth pitch and tooth angle mounted on said driver to be driven thereby;

said cam translatable axially of said driver;

means for axially positioning said cam on said driver; and a plurality of cam followers each successively contacting said cam to be driven thereby arranged to form a cam follower cluster mounted for rotation about an axis perpendicular to said driver axis.

10. The combination set forth in claim 9 wherein said means for axially positioning said cam on said driver comprises helical gear teeth on said driver engaging internal helical teeth in said cam.

11. The combination set forth in claim 9 wherein said means for axially positioning said cam on said driver comprises variable pitch helical grooves formed in said driver and including means secured to said cam for engaging said grooves.

12. The combination set forth in claim 9 wherein said means for axially positioning said cam on said driver comprises a splined driver engaging mating internal splines within said cam and including a selector mechanism engaging said cam for positioning said cam on said driver.

13. In a variable speed transmission, the improvement comprising:

a cam driver for connection to a source of power, said driver mounted for rotation about a driver axis;

a cylinder cam formed with a cammed tooth having a continuously varying tooth pitch and tooth angle, said tooth beginning at one end of said cam and terminating at an opposite end of said cam, said tooth having a continuously varying thickness at its outer face;

said cam translatable axially of said driver;

means for axially positioning said cam on said driver; and a plurality of cam followers each successively contacting said cam to be driven thereby arranged to form a cam follower cluster mounted for rotation about an axis perpendicular to said driver axis.

14. The combination set forth in claim 13 wherein said means for axially positioning said cam on said driver comprises helical gear teeth on said driver engaging internal helical teeth in said cam.

15. The combination set forth in claim 13 wherein said means for axially positioning said cam on said driver comprises variable pitch helical grooves formed in said driver and including means secured to said cam for engaging said grooves.

16. The combination set forth in claim 13 wherein said means for axially positioning said cam on said driver comprises a splined driver engaging mating internal splines within said cam and including a selector mechanism engaging said cam for positioning said cam on said driver.

17. An automatic transmission comprising:

an input drive shaft;

means connecting said drive shaft to a first and a second drive couple, each said drive couple comprising;

a cam driver mounted for rotation about a driver axis;

an open ended cylinder cam having a camming tooth with a continuously varying tooth pitch and tooth angle mounted on said driver to be driven thereby;

said cam translatable axially of said driver;

means for axially positioning said cam on said driver;

said cylinder cams contacting and driving a plurality of cam followers, said cam followers arranged to form a cluster mounted for rotation about an axis perpendicular to said driver axes;

an output shaft; and means connecting said output shaft to said cluster.

18. The combination set forth in claim 17 wherein said means for axially positioning the cam of each drive couple on the corresponding driver comprises helical gear teeth on each said driver engaging internal teeth in each corresponding cam.

19. The combination set forth in claim 17 wherein said means for axially positioning the cam of each drive couple on the corresponding driver comprises variable pitch helical grooves formed in each said driver and including means secured to each corresponding cam for engaging said grooves.

20. The combination set forth in claim 17 wherein said means for axially positioning the cam of each drive couple on the corresponding driver comprises splined drivers each engaging mating internal splines within a corresponding cam and including a selector mechanism engaging said cams for positioning said cams on said drivers.

21. An automatic transmission comprising:

an input drive shaft;

means connecting said drive shaft to a plurality of pairs of drive couples, each pair of couples comprising a first and a second drive couple with each drive couple comprising:

a cam driver mounted for rotation about a driver axis;

an open ended cylinder cam having a camming tooth with a continuously varying tooth pitch and tooth angle mounted on said driver to be driven thereby;

said cylinder cam translatable axially of said driver;

means for axially positioning said cam on said driver;

said cylinder cams contacting and driving a plurality of cam followers, said cam followers arranged to form a cluster mounted for rotation about an axis perpendicular to said driver axes;

each pair of drive couples driving a different cluster;

an output shaft; and means connecting said output shaft to said clusters.

22. The combination set forth in claim 21 wherein said means for axially positioning the cam of each drive couple on the corresponding driver comprises helical gear teeth on each said driver engaging internal teeth in each corresponding cam.

23. The combination set forth in claim 21 wherein said means for axially positioning the cam of each drive couple on the corresponding driver comprises variable pitch helical grooves formed in each said driver and including means secured to each corresponding cam for engaging said grooves.

24. The combination set forth in claim 21 wherein said means for axially positioning the cam of each drive couple on the corresponding driver comprises splined drivers each engaging mating internal splines within a corresponding cam and including a selector mechanism engaging said cams for positioning said cams on said drivers.

* * * * *